(12) United States Patent
Kim

(10) Patent No.: US 8,591,380 B2
(45) Date of Patent: Nov. 26, 2013

(54) HYDRAULIC CONTROL SYSTEM OF CONTINUOUSLY VARIABLE TRANSMISSION FOR VEHICLE

(75) Inventor: Hyunsuk Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 449 days.

(21) Appl. No.: 12/958,014

(22) Filed: Dec. 1, 2010

(65) Prior Publication Data
US 2012/0094797 A1    Apr. 19, 2012

(30) Foreign Application Priority Data
Oct. 14, 2010 (KR) .......................... 10-2010-0100447

(51) Int. Cl.
*F16H 61/26* (2006.01)
(52) U.S. Cl.
USPC .......................................................... 477/130
(58) Field of Classification Search
USPC .......... 475/131, 134; 477/127, 128, 130, 131, 477/138, 143, 150
See application file for complete search history.

(56) References Cited

U.S. PATENT DOCUMENTS

| | | | | |
|---|---|---|---|---|
| 6,656,075 B2* | 12/2003 | Park et al. | ...................... | 475/128 |
| 8,157,702 B2* | 4/2012 | Dohi et al. | ...................... | 477/76 |
| 8,210,977 B2* | 7/2012 | Hirose | ........................... | 475/119 |
| 2012/0283066 A1* | 11/2012 | Nakade et al. | .................. | 477/79 |

* cited by examiner

*Primary Examiner* — Troy Chambers
*Assistant Examiner* — Michael Gonzalez
(74) *Attorney, Agent, or Firm* — Morgan, Lewis & Bockius LLP

(57) ABSTRACT

A hydraulic control system of a continuously variable transmission for a vehicle reduces cost and improves quality reliability by adding switch valve function to a manual valve. The hydraulic control system may control a first brake operated at a first forward speed, a first clutch operated at a second forward speed, and a second brake operated at a reverse speed. The first clutch and the second brake may be operated by operation pressure controlled by a first proportional control solenoid valve and supplied through a manual valve, and the first brake may be operated by operation pressure controlled by a second proportional control solenoid valve, wherein the second proportional control solenoid valve controls hydraulic pressure received from the manual valve to be supplied to the first brake as the operation pressure.

3 Claims, 5 Drawing Sheets

HYDRAULIC CONTROL SYSTEM OF CONTINUOUSLY VARIABLE TRANSMISSION FOR VEHICLE

CROSS-REFERENCE TO RELATED APPLICATION

This application claims priority to and the benefit of Korean Patent Application No. 10-2010-0100447 filed in the Korean Intellectual Property Office on Oct. 14, 2010, the entire contents of which application is incorporated herein for all purposes by this reference.

BACKGROUND OF THE INVENTION

1. Field of the Invention

The present invention relates to a continuously variable transmission of a vehicle. More particularly, the present invention relates to a hydraulic control system of a continuously variable transmission for a vehicle which reduces cost and improves quality reliability by adding switch valve function to a manual valve.

2. Description of the Related Art

Generally, continuously variable transmissions used in a vehicle include a shift belt apparatus, a forward and reverse speed control apparatus consisting of planetary gear sets, and a hydraulic control system controlling friction elements used in the forward and reverse speed control apparatus.

Torque of an engine is input to the shift belt apparatus through a primary pulley and is output from the shift belt apparatus through the secondary pulley. At this time, continuously variable shifting is achieved by changing radii of the primary pulley and the secondary pulley.

The forward and reverse speed control apparatus includes single or double pinion planetary gear set and a plurality of friction elements controlling the planetary gear set. The forward and reverse speed control apparatus changes a direction of torque received from the secondary pulley to be forward direction or reverse direction according to the control of the friction elements.

The forward and reverse speed control apparatus may achieve only one forward speed and one reverse speed but may generally achieve two forward speeds and one reverse speed so as to enhance power delivery efficiency.

The hydraulic control system controls operation of the friction elements used in the forward and reverse speed control apparatus so as to achieve two forward speeds and one reverse speed. A conventional hydraulic control system achieving two forward speeds and one reverse speed is shown in FIG. 1.

For achieving two forward speeds and one reverse speed, a first brake B1 achieving a first forward speed, a first clutch C1 achieving a second forward speed, and a second brake B2 achieving a reverse speed are used, and the conventional hydraulic control system controls the friction elements C1, B1, and B2.

In further detail, hydraulic pressure supplied from well-known pressure control means (not shown) is supplied to a switch valve 4 through a manual valve 2 which is controlled according to range selection of a select lever at a driver's seat.

Then, the switch valve 4 selectively supplies forward and reverse speed pressures received from the manual valve 2 to the first pressure control solenoid valve 6, and the first pressure control solenoid valve 6 controls the hydraulic pressure and supplies the hydraulic pressure back to the switch valve 4 through other line.

In addition, control pressure of the first pressure control solenoid valve 6 supplied to the switch valve 4 is supplied to the first clutch C1 or the second brake B2 as operation pressure thereof.

In addition, a portion of the forward speed pressure supplied from the manual valve 2 is supplied to the second pressure control solenoid valve 8, is controlled by the second pressure control solenoid valve 8, and is supplied to the first brake B1.

For achieving the operation as described above, the manual valve 2 includes a first port 10 receiving the hydraulic pressure from the pressure control means, a second port 12 supplying the hydraulic pressure supplied to the first port 10 to the switch valve 4 and the second pressure control solenoid valve 8 at D range, and a third port 14 supplying the hydraulic pressure supplied to the first port 10 to the switch valve 4 at R range.

Accordingly, the hydraulic pressure of the first port 10 is supplied to the second port 12 at the D range, and the hydraulic pressure of the first port 10 is supplied to the third port 14 at the R range.

In addition, the switch valve 4 includes a first port 16 disposed at an end thereof and receiving the forward speed pressure from the manual valve 2 as control pressure thereof, a second port 18 disposed next to the first port 16 and receiving the hydraulic pressure from the first pressure control solenoid valve 6, a third port 20 supplying the hydraulic pressure of the second port 18 to the first clutch C1, a fourth port 22 supplying the hydraulic pressure of the second port 18 to the second brake B2, a fifth port 24 receiving the forward speed pressure from the manual valve 2, a sixth port 26 receiving the reverse speed pressure from the manual valve 2, and a seventh port 28 selectively supplying the hydraulic pressure supplied to the fifth and sixth ports 24 and 26 to the first pressure control solenoid valve 6.

Accordingly, the forward speed pressure supplied to the fifth port 24 is supplied to the first pressure control solenoid valve 6 through the seventh port 28 and is controlled at the D range, and the forward speed pressure controlled by the first pressure control solenoid valve 6 is supplied to the first clutch C1 through the second and third ports 18 and 20.

In addition, the reverse speed pressure supplied to the sixth port 26 is supplied to the first pressure control solenoid valve 6 through the seventh port 28 and is controlled at the R range, and the reverse speed pressure controlled by the first pressure control solenoid valve 6 is supplied to the second brake B2 through the second and fourth ports 18 and 22.

In addition, the hydraulic pressure controlled by the second pressure control solenoid valve 8 is supplied to the first brake B1 as operation pressure.

Accordingly, the first brake B1 is operated at the first forward speed, the first clutch C1 is operated at the second forward speed, and the second brake B2 is operated at the reverse speed such that two forward speeds and one reverse speed is achieved.

According to the conventional hydraulic control system of a continuously variable transmission, an additional switch valve of spool valve is used and hydraulic lines corresponding thereto are formed. Therefore, structure of a valve body may be complex, cost may rise, valve stick may occur, and quality reliability may be deteriorated.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

The present invention has been made in an effort to provide a hydraulic control system of a continuously variable transmission for a vehicle having advantages of reducing cost and improving quality reliability by adding switch valve function to a manual valve.

A hydraulic control system of a continuously variable transmission for a vehicle according to various aspects of the present invention may control a first brake operated at a first forward speed, a first clutch operated at a second forward speed, and a second brake operated at a reverse speed.

The first clutch and the second brake may be operated by operation pressure controlled by a first proportional control solenoid valve and supplied through a manual valve, and the first brake may be operated by operation pressure controlled by a second proportional control solenoid valve, wherein the second proportional control solenoid valve controls hydraulic pressure received from the manual valve to be supplied to the first brake as the operation pressure.

The manual valve may include a first port receiving line pressure, a second port supplying hydraulic pressure received through the first port to the second proportional control solenoid valve, a third port receiving hydraulic pressure from the first proportional control solenoid valve, a fourth port supplying hydraulic pressure of the third port to the first clutch, and a fifth port supplying the hydraulic pressure of the third port to the second brake.

Accumulators may be disposed respectively at a line connecting the first proportional control solenoid valve with the manual valve and a line connecting the second proportional control solenoid valve with the first brake so as to supply hydraulic pressure stably.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION

Figure 1:
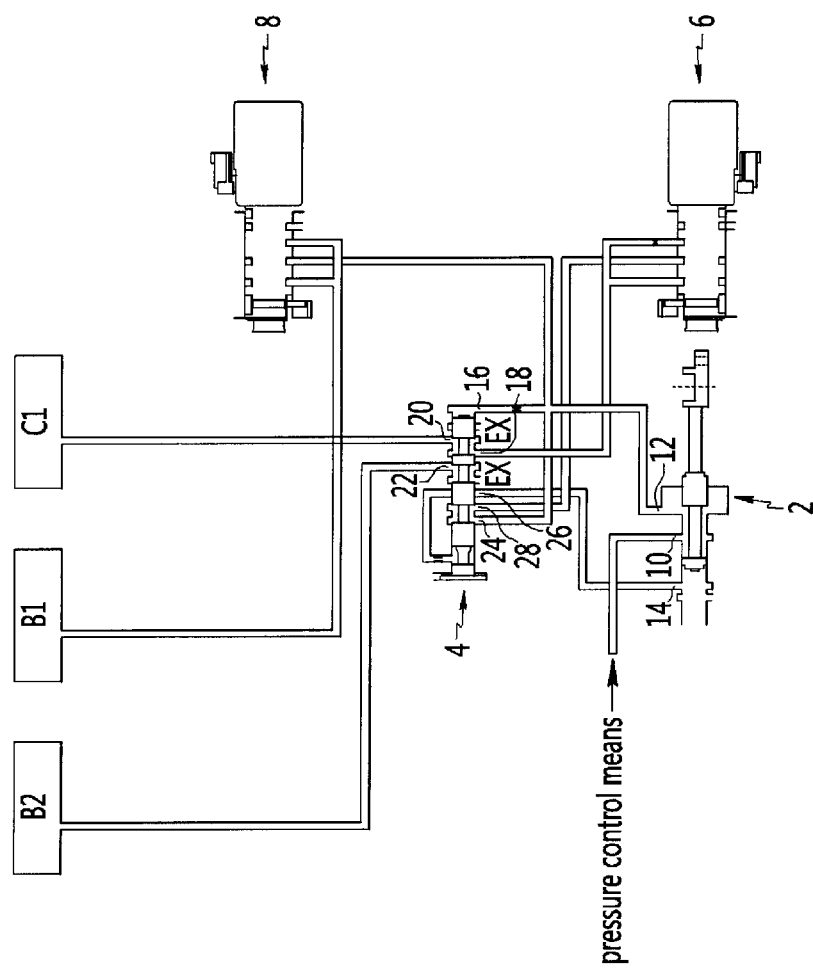
FIG. 1 is a schematic diagram showing a conventional hydraulic control system of a continuously variable transmission.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components which are not necessary for explaining the present invention will be omitted, and the same constituent elements are denoted by the same reference numerals in this specification.

Figure 2:
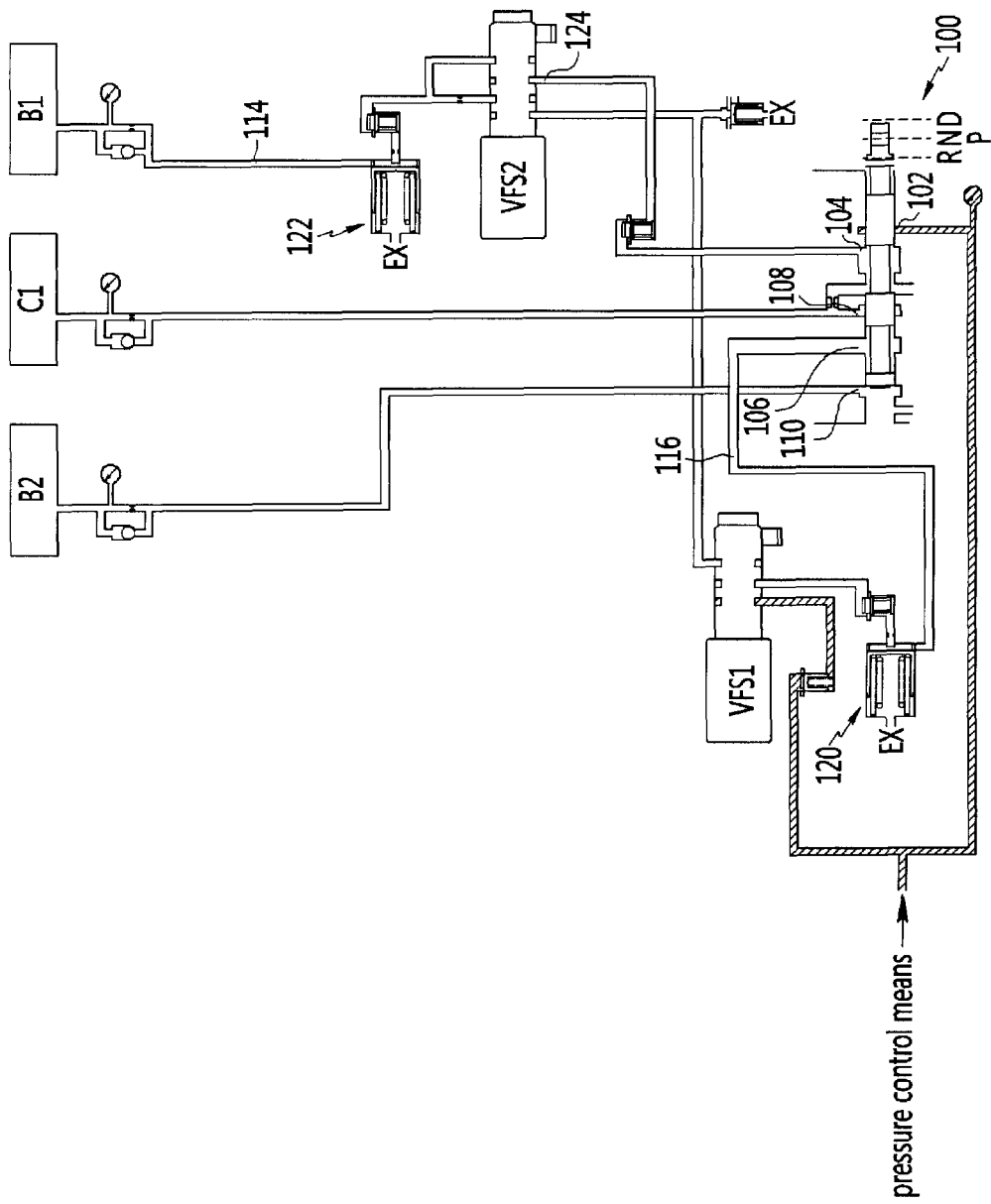
FIG. 2 is a schematic diagram showing an exemplary hydraulic control system according to the present invention at N-P range.

FIG. 2 shows a hydraulic control system of an exemplary continuously variable transmission according to the present invention. In various embodiments of the present invention is the hydraulic control system controlling a first brake B1 for achieving a first forward speed, a first clutch C1 for achieving a second forward speed, and a second brake B2 for achieving a reverse speed.

In further detail, if hydraulic pressure is generated by a hydraulic pump and is supplied to pressure control means, the pressure control means controls the hydraulic pressure to be changed into line pressure suitable for operating the continuously variable transmission.

Then, a portion of the line pressure is supplied to a manual valve 100 which is controlled according to range change of a select lever at a driver's seat, and the other portion of the line pressure is controlled by a first proportional control solenoid valve VFS1 and is supplied to the manual valve 100.

In addition, the hydraulic pressure directly supplied to the manual valve 100 is controlled by a second proportional control solenoid valve VFS2 and is supplied to the first brake B1 as operation pressure at D range. The hydraulic pressure supplied to the manual valve 100 through the first proportional control solenoid valve VFS1 is supplied to the first clutch C1 at the D range and is supplied to the second brake B2 at R range.

For this purpose, the manual valve 100 includes a first port 102 receiving the line pressure, a second port 104 supplying the hydraulic pressure supplied to the first port 102 to the second proportional control solenoid valve VFS2, a third port 106 receiving the hydraulic pressure from the first proportional control solenoid valve VFS1, a fourth port 108 supplying the hydraulic pressure of the third port 106 to the first clutch C1, and a fifth port 110 supplying the hydraulic pressure of the third port 106 to the second brake B2.

Accordingly, the line pressure is blocked by the manual valve 100 and the first proportional control solenoid valve VFS1 and all the friction elements do not operate at N-P range as shown in FIG. 2.

Figure 3:
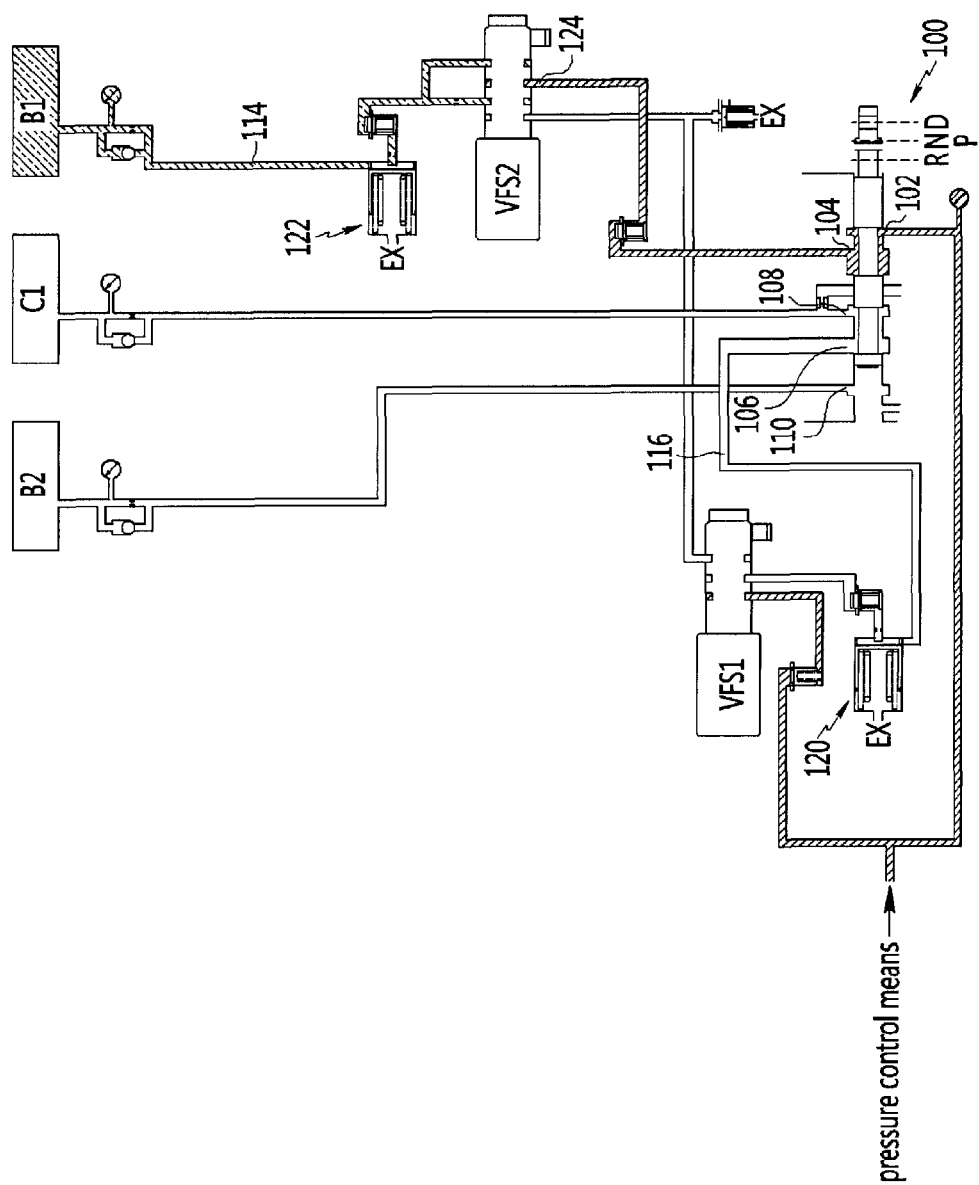
FIG. 3 is a schematic diagram showing an exemplary hydraulic control system according to the present invention at the first forward speed.

As shown in FIG. 3, the hydraulic pressure supplied to the first port 102 of the manual valve 100 is supplied to the second proportional control solenoid valve VFS2 through the second port 102, and the hydraulic pressure controlled by the second proportional control solenoid valve VFS2 is supplied to the first brake B1 at a first forward speed of D range.

Figure 4:
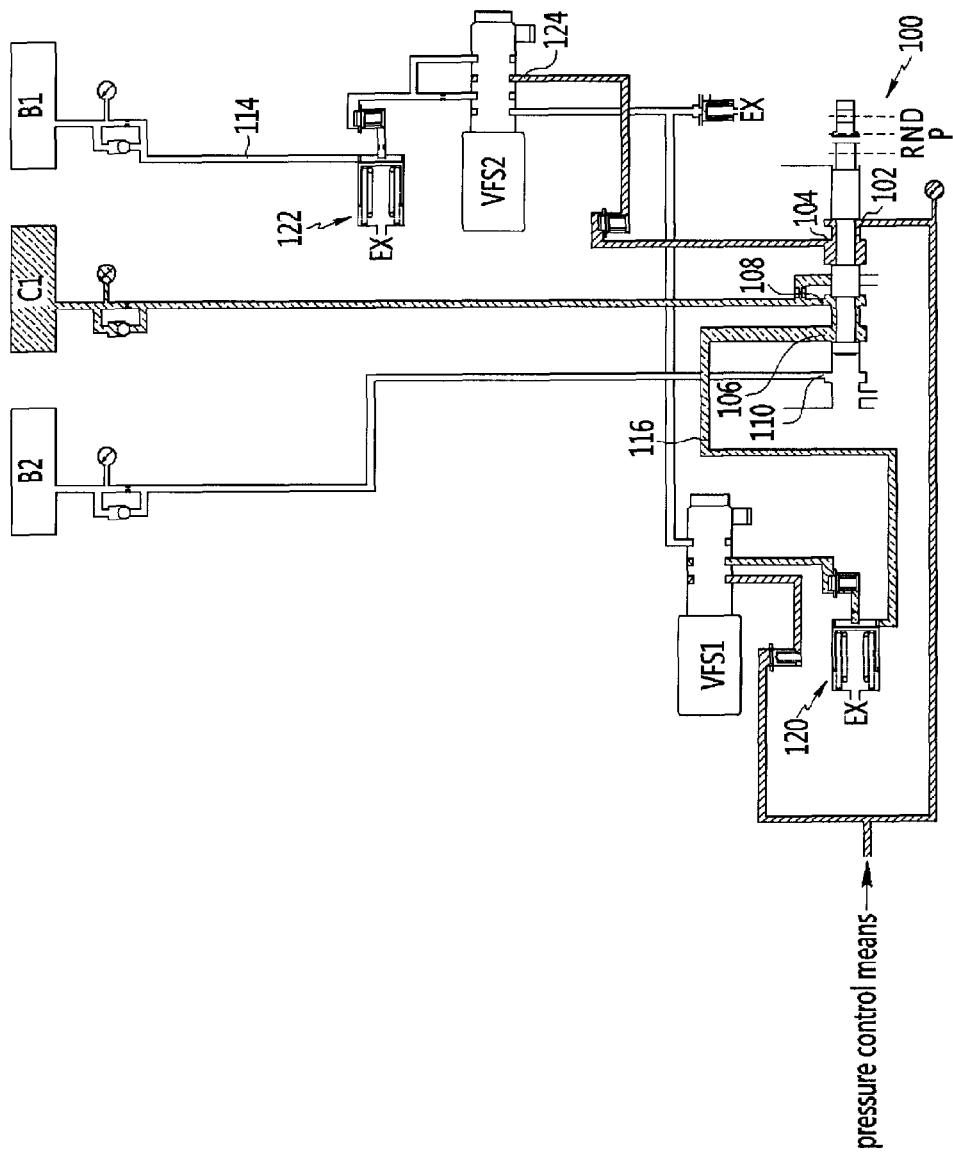
FIG. 4 is a schematic diagram showing an exemplary hydraulic control system according to the present invention at the second forward speed.

As shown in FIG. 4, the second proportional control solenoid valve VFS2 blocks the hydraulic pressure supplied to the first brake B1, and the hydraulic pressure controlled by the first proportional control solenoid valve VFS1 is supplied to the first clutch C1 through the third port 106 and the fourth port 108 of the manual valve 100 at a second forward speed.

Figure 5:
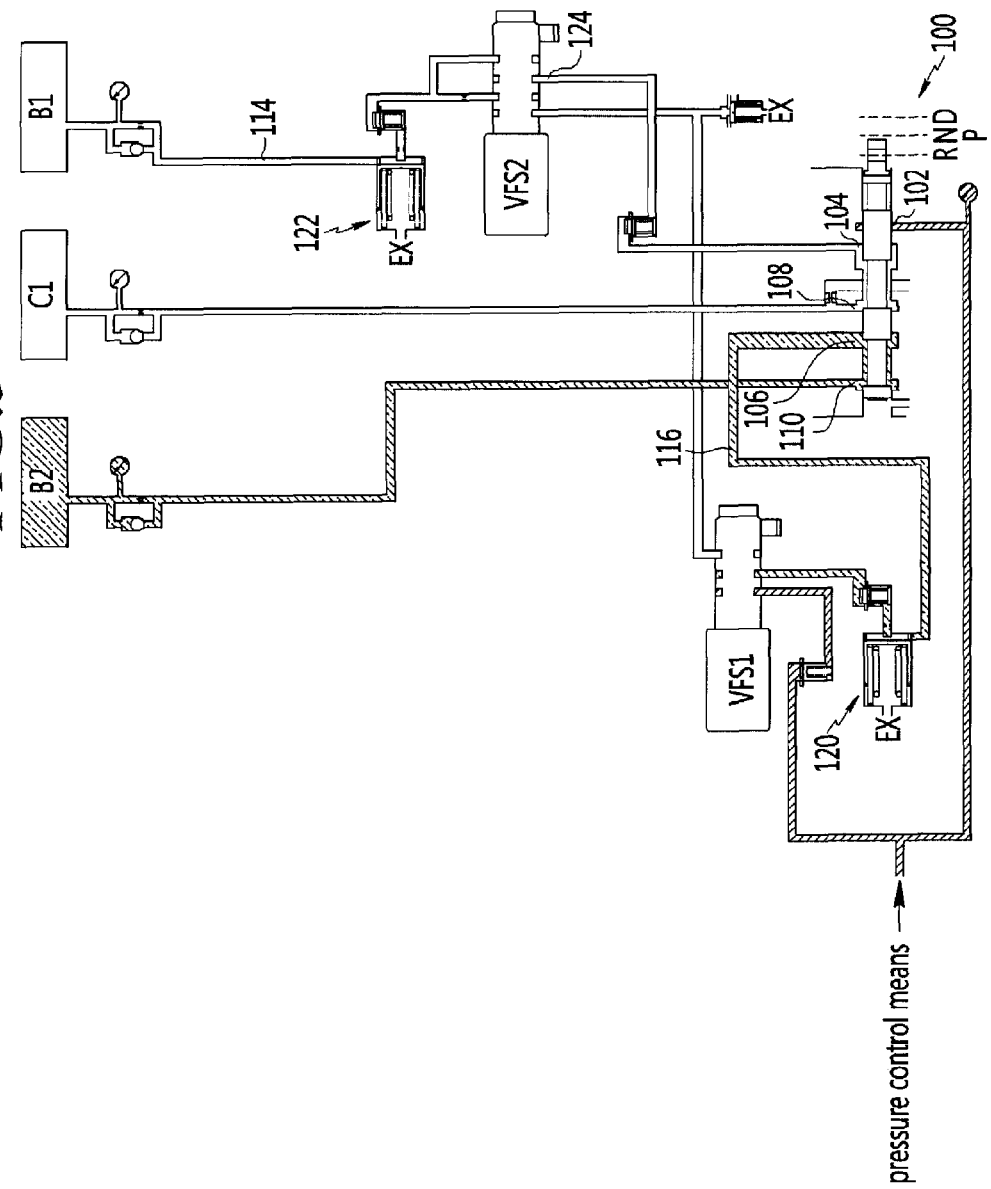
FIG. 5 is a schematic diagram showing an exemplary hydraulic control system according to the present invention at the reverse speed.

As shown in FIG. 5, the line pressure directly supplied to the manual valve 100 is blocked, and the hydraulic pressure controlled by the first proportional control solenoid valve VFS1 is supplied to the second brake B2 through the third port 106 and the fifth port 110 of the manual valve 100 at R range.

That is, the first clutch C1 and the second brake B2 operated respectively at the second forward speed and the reverse speed are operated by the operation pressure controlled by the first proportional control solenoid valve VFS1 and supplied through the manual valve 100, and the first brake B1 operated at the first forward speed is operated by the operation pressure controlled by the second proportional control solenoid valve VFS2. That is, the second proportional control solenoid valve VFS2 receives the hydraulic pressure from the manual valve 100 and supplies the operation pressure to the first brake B1.

In addition, accumulators 120 and 122 are disposed respectively at a line 116 connecting the first proportional control solenoid valve VFS1 with the manual valve 100 and a line 114 connecting the second proportional control solenoid valve VFS2 with the first brake B1 so as to stably supply the hydraulic pressure in the hydraulic control system of the present invention.

In addition, the first and second proportional control solenoid valves VFS1 and VFS are proportional control valves. The first proportional control solenoid valve VFS1 is normal open type, and the second proportional control solenoid valve VFS2 is normal cross type.

As described above, since a switch valve being a spool valve is removed and function of the switch valve is done by a manual valve, the number of components may be reduced, structure of a valve body may be simplified, and manufacturing cost may be curtailed according to a hydraulic control system of the present invention.

In addition, since a valve stick caused by the spool valve is prevented, deterioration of quality reliability caused by occurrence of the valve stick may be prevented.

since a switch valve being a spool valve is removed and function of the switch valve is done by a manual valve, the number of components may be reduced, structure of a valve body may be simplified, and manufacturing cost may be curtailed according to the present invention.

In addition, since a valve stick caused by the spool valve is prevented, deterioration of quality reliability caused by occurrence of the valve stick may be prevented.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic control system of a continuously variable transmission for a vehicle comprising:
    a first brake operated at a first forward speed;
    a first clutch operated at a second forward speed; and
    a second brake operated at a reverse speed;
    wherein the first clutch and the second brake are operated by operation pressure supplied directly from a manual valve, wherein the operation pressure supplied directly from the manual valve is controlled by a first proportional control solenoid valve and is supplied to the manual valve, and the first brake is operated by operation pressure controlled by a second proportional control solenoid valve, wherein the second proportional control solenoid valve controls hydraulic pressure received from the manual valve to be supplied to the first brake as the operation pressure.

2. A hydraulic control system of a continuously variable transmission for a vehicle comprising:
    a first brake operated at a first forward speed;
    a first clutch operated at a second forward speed; and
    a second brake operated at a reverse speed;
    wherein the first clutch and the second brake are operated by operation pressure controlled by a first proportional control solenoid valve and supplied through a manual valve, and the first brake is operated by operation pressure controlled by a second proportional control solenoid valve, wherein the second proportional control solenoid valve controls hydraulic pressure received from the manual valve to be supplied to the first brake as the operation pressure;
    wherein the manual valve comprises a first port receiving line pressure, a second port supplying hydraulic pressure received through the first port to the second proportional control solenoid valve, a third port receiving hydraulic pressure from the first proportional control solenoid valve, a fourth port supplying hydraulic pressure of the third port to the first clutch, and a fifth port supplying the hydraulic pressure of the third port to the second brake.

3. A hydraulic control system of a continuously variable transmission for a vehicle comprising:
    a first brake operated at a first forward speed;
    a first clutch operated at a second forward speed; and
    a second brake operated at a reverse speed;
    wherein the first clutch and the second brake are operated by operation pressure controlled by a first proportional control solenoid valve and supplied through a manual valve, and the first brake is operated by operation pressure controlled by a second proportional control solenoid valve, wherein the second proportional control solenoid valve controls hydraulic pressure received from the manual valve to be supplied to the first brake as the operation pressure;
    wherein accumulators are disposed respectively at a first line connecting the first proportional control solenoid valve with the manual valve and a second line connecting the second proportional control solenoid valve with the first brake so as to supply hydraulic pressure stably.

* * * * *